(12) United States Patent
Hunwick (10) Patent No.: US 10,857,503 B2
(45) Date of Patent: *Dec. 8, 2020

(54) PROCESS AND SYSTEM FOR CAPTURING CARBON DIOXIDE FROM A GAS STREAM

(71) Applicant: Richard Hunwick, New South Wales (AU)

(72) Inventor: Richard Hunwick, New South Wales (AU)

(73) Assignee: ICSIP PTY LTD, Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/064,890

(22) PCT Filed: Dec. 22, 2016

(86) PCT No.: PCT/AU2016/051274
§ 371 (c)(1),
(2) Date: Jun. 21, 2018

(87) PCT Pub. No.: WO2017/106923
PCT Pub. Date: Jun. 29, 2017

(65) Prior Publication Data
US 2019/0001265 A1  Jan. 3, 2019

(30) Foreign Application Priority Data

Dec. 22, 2015 (AU) ................................. 2015905318

(51) Int. Cl.
*B01D 53/62* (2006.01)
*B01D 53/80* (2006.01)
*B01D 53/96* (2006.01)

(52) U.S. Cl.
CPC ............. *B01D 53/62* (2013.01); *B01D 53/80* (2013.01); *B01D 2251/302* (2013.01);
(Continued)

(58) Field of Classification Search
None
See application file for complete search history.

(56) References Cited

U.S. PATENT DOCUMENTS 10,131,968 B2 * 11/2018 Hunwick .................. C22B 3/02

FOREIGN PATENT DOCUMENTS

WO   WO2009077358   6/2009
WO   WO2011077117   6/2011
(Continued)

OTHER PUBLICATIONS

International Search Report from International Application No. PCT/AU2016/051274, dated Mar. 27, 2017.
(Continued)

*Primary Examiner* — Daniel Berns
(74) *Attorney, Agent, or Firm* — Davidson, Davidson & Kappel (57) ABSTRACT

A process and system are disclosed for capturing carbon dioxide from a gas stream. The process and system comprise a first stage, in which a metal silicate is reacted with nitric acid to produce a metal nitrate. The metal silicate can be one or more of: an alkaline-earth metal silicate, in particular magnesium or calcium; or an alkali metal silicate, in particular lithium. The process and system also comprise a second stage, in which the metal nitrate from the first stage is heated to a temperature sufficient to decompose the metal nitrate to a metal oxide. The process and system further comprise a third stage, in which the metal oxide is mixed with water to convert the metal oxide to a metal hydroxide solution. The process and system additionally comprise a fourth stage, in which the gas stream is scrubbed with the solution from the third stage such that the metal hydroxide reacts with the carbon dioxide to form a metal carbonate/bicarbonate product.

15 Claims, 2 Drawing Sheets

Process for CCS by Nitric acid leach, no transport (52) U.S. Cl.
CPC .. *B01D 2251/402* (2013.01); *B01D 2251/404* (2013.01); *B01D 2251/504* (2013.01); *B01D 2257/504* (2013.01); *B01D 2258/0283* (2013.01); *Y02C 20/40* (2020.08)

(56) References Cited

FOREIGN PATENT DOCUMENTS

| | | |
|---|---|---|
| WO | WO 2012172512 A1 | 12/2012 |
| WO | WO 2015099612 A1 | 7/2015 |

OTHER PUBLICATIONS

Teir et al. "Production of magnesium carbonates from serpentinite for long-term storage of CO2" International Journal of Mineral Processing; 85(1-3); (2007); pp. 1-15.
European Search Report dated Jul. 1, 2019 from corresponding European Application No. EP 16 87 7012.

* cited by examiner

Figure 1. Process for CCS by Nitric acid leach, no transport

Figure 2. Process for CCS by Nitric acid leach, overland transport

PROCESS AND SYSTEM FOR CAPTURING CARBON DIOXIDE FROM A GAS STREAM

This application is a U.S. national phase application under 35 U.S.C. of § 371 of International Application No. PCT/AU2016/051274, filed Dec. 22, 2016, which claims priority of Australian Patent Application No. 2015905318, filed Dec. 22, 2015 the disclosures of which are hereby incorporated by reference herein.

TECHNICAL FIELD

A process and system are disclosed for capturing carbon dioxide from a gas stream. The gas stream may originate as flue gas from a coal-fired power station or may originate from other point sources such as power stations fired by other fossil fuels including natural gas. It may also originate in flue gases from blast furnaces and steel mills, cement plants and other industrial sites including oil and metal refineries, from processes involving the reforming of hydrocarbon fuels such as the manufacture of ammonia from natural gas, or from the burning of any other fuels containing carbon including biomass-derived fuels such as alcohols, agricultural residues and biogas.

BACKGROUND ART

There is increased focus internationally on reducing carbon dioxide emissions to the atmosphere, to help minimise the effects of global warming. Carbon dioxide sinks exist naturally, including the weathering of silicate rocks to form carbonates, and the world's oceans. Plants are also an effective form of carbon dioxide sink and use photosynthesis to remove carbon from the atmosphere by incorporating it into biomass. However, these naturally occurring sinks are not capable of effectively keeping up with the vast quantities of carbon dioxide being produced in today's energy-thirsty world.

While as indicated there are many point sources, the largest single class of sources of excess carbon dioxide gases are fossil fuel power stations which, when fuelled by black coal, on average typically emit around 0.8 to one tonne of the gas for each MegaWatt-hour (MWh) of electricity they generate. For example, a large power station such as the 2,800 MW Bayswater in the Hunter Valley of New South Wales, Australia, in generating 20 million MWh of electricity in a year, would also emit of the order of 18 million tonnes of carbon dioxide. Brown coal and lignite-fired power stations emit even more carbon dioxide per MWh generated. It would be advantageous if there was a system and method capable of capturing some if not most of the carbon dioxide emitted from such power stations. It would also be advantageous if a system and method were provided for the permanent storage of the gas in a manner that was thermodynamically and geologically stable, thereby avoiding any requirement for the stages to be monitored for leaks and emissions essentially in perpetuity.

The above references to the background art do not constitute an admission that such art forms a part of the common and/or general knowledge of a person of ordinary skill in the art. The above references are also not intended to limit the application of the process and system as disclosed herein.

SUMMARY OF THE DISCLOSURE

Disclosed herein is a process and system for capturing carbon dioxide from a gas stream. The process can permanently store this carbon dioxide in a safe and economical manner. The gas stream may originate as flue gas from coal- and other carbon-containing fuel-fired power stations (e.g. fossil fuels such as natural gas, biomass-derived fuels such as alcohols, agricultural residues, biogas, etc). The gas stream may also originate from other point sources such as steel mills, cement plants, oil and metal refineries and the like. The gas stream may contain other gases, for example, carbon dioxide may be only a minor component of the gas stream. In this regard, in the case of a coal-fired power station, the typical concentration may be around 12-15 percent by weight, the balance being atmospheric nitrogen, some oxygen also from air, water vapour, and some impurity gases, in particular acid-forming gases: oxides of sulphur from the combustion of sulphur-containing materials in the coal (referred to generally as SOx), and oxides of nitrogen, both from the combustion of nitrogen-containing materials in the coal and from reactions between atmospheric nitrogen and oxygen initiated by the high temperatures generated by the combustion of the fuel (referred to generally as NOx).

In a first stage, the process and system as disclosed herein comprise reacting a metal silicate with nitric acid to produce a metal nitrate. The process and system suitably employ a metal silicate being one or more of: an alkaline-earth metal silicate, in particular magnesium or calcium; or an alkali metal silicate, in particular lithium; or mixtures thereof. When reacted with nitric acid these metal silicates form metal nitrates that can subsequently be thermally decomposed to a metal oxide, which can then be used in the scrubbing of carbon dioxide contacting flue gases.

The first stage reactor can comprise can comprise a digestor. The digestor may take the form of a single or continuous pressure vessel (such as a single or continuous autoclave), one or more pipelines, or one or a series of stirred and pressurised vessels, interconnected and agitated compartments contained within a single pressure vessel, etc. Alternatively, the digestor may take the form of a non-pressure vessel such as a tank or tower reactor (e.g. a continuously stirred tank reactor, vertical hopper or silo reactor, hollow flite screw conveyor, etc).

In a second stage, the process and system as disclosed herein comprise heating the metal nitrate from the first stage to a temperature that is sufficient to decompose the metal nitrate to a metal oxide. The second stage reactor can comprise, for example, a circulating fluidized bed reactor that is operated at temperatures in excess of the metal nitrate decomposition temperature. The second stage reactor can progressively heat metal nitrate to a temperature that is sufficient to dry it and then, with further heating, to decompose it.

In a third stage, the process and system as disclosed herein comprise mixing the metal oxide with water to convert the metal oxide to a metal hydroxide solution. The third stage reactor can comprise e.g. a tank reactor in which solids from the second reactor are added into a controlled amount of water to form a slurry of metal hydroxide.

In a fourth stage, the process and system as disclosed herein comprise scrubbing the gas stream with the solution from the third stage such that the metal hydroxide reacts with the carbon dioxide to form a metal carbonate/bicarbonate product. The fourth stage reactor can comprise a scrubbing tower r column in which metal hydroxide slurry that is e.g. pumped from the third stage can be sprayed downwardly into an upcoming gas stream that comprises the carbon dioxide. A proportion of the slurry may be recirculated through the scrubbing stage to improve scrubbing efficiency.

In one embodiment, the decomposition of the metal nitrate to the metal oxide in the second stage can produce off-gases which can be passed to a fifth stage in which they are contacted by a recirculating aqueous stream to produce nitric acid for use in the first stage (i.e. for use in the first reactor). The fifth stage reactor can comprise one or more absorption towers for the production of nitric acid.

In one embodiment, the second stage heating of the metal nitrate can comprise the combustion of a fuel (e.g. a fossil fuel) which, together with the decomposition of the metal nitrate, can produce off-gases comprising a mix of nitrogen and oxygen (such as from air), carbon dioxide, nitrogen dioxide, nitric oxide and water vapour. The off-gases from nitric acid production (i.e. that still comprise carbon dioxide) can be passed to the fourth stage scrubber.

The nitric acid that is passed to the first stage may comprise a concentrated blend of nitric acid and water, such as from 65 wt. % (e.g. 68 wt. %) up to 90 wt. % nitric acid. To expedite formation of the metal nitrate, the metal silicate and nitric acid can be reacted together at elevated pressures and temperatures, such as a temperature close to the boiling point of a liquid phase for a given first stage pressure.

The metal silicate and nitric acid can be blended to form a paste, slurry or solution. A paste can be preferred as it is easier to handle in a continuous reactor and can give better solids-liquids contact.

In one variation of the process and system, such as where the source of the metal silicate is located remotely from the flue gas source, prior to the metal nitrate paste, slurry or solution being passed to the second stage, insoluble solids may be separated therefrom (e.g. for repatriation into the site of the metal nitrate deposit). This can, in turn, reduce the amount of solids material that needs to be transported to the flue gas source. This separation can take place in a solids separator, such as one or more counter-current decantation thickeners, horizontal belt vacuum filters, vacuum drum filters or plate and frame filter presses, that are arranged between the first and second reactors.

In one embodiment, prior to being passed to the third stage, dried and decomposed metal oxide solids from the second stage may be cooled. The solids may be cooled by exchanging heat with air for combustion that is fed into the second stage reactor. Then, in the third stage, the cooled solids can be added into a controlled amount of water to form a metal hydroxide slurry (an optimal form for fourth stage scrubbing).

In one embodiment, solids from the fourth stage can be passed to a solids-liquids separation stage in which the carbonate/bicarbonate solids are separated from water, with the water being returned to the process. This separation stage can comprise a solids-liquids separation unit, such as a paste thickener, vacuum or pressure filter.

BRIEF DESCRIPTION OF THE DRAWINGS

Embodiments of a process and system as set forth in the Summary will now be described, by way of example only, with reference to the accompanying drawings, in which.

DETAILED DESCRIPTION OF SPECIFIC EMBODIMENTS

In the following description, embodiments of the process and system are described in the context of the capture of carbon dioxide contained within flue gases emitted by a fossil fuel-fired power station. However, it is to be understood that the process and system may equally be employed for the capture of carbon dioxide from any 'point' source and are not limited to the particular arrangements described herein.

In the first instance, a general reference will be made to both process and system variants of FIGS. 1 and 2. Then, particular reference with be made to FIG. 1 in detail, which Figure schematically depicts the major elements of a likely embodiment of the process and system. In this regard, FIG. 1 shows a carbon dioxide sequestration process and system appropriate for when the carbon dioxide is contained in flue or other gases at or near atmospheric pressure, and the metal silicate is a magnesium or calcium silicate, and the costs of transporting metal silicate and carbonated mineral products between the source of the carbon dioxide (for example a coal-fired power station) and the source of metal silicate rocks, are not material to the overall cost of capturing and storing a tonne of carbon dioxide.

Figure 1:
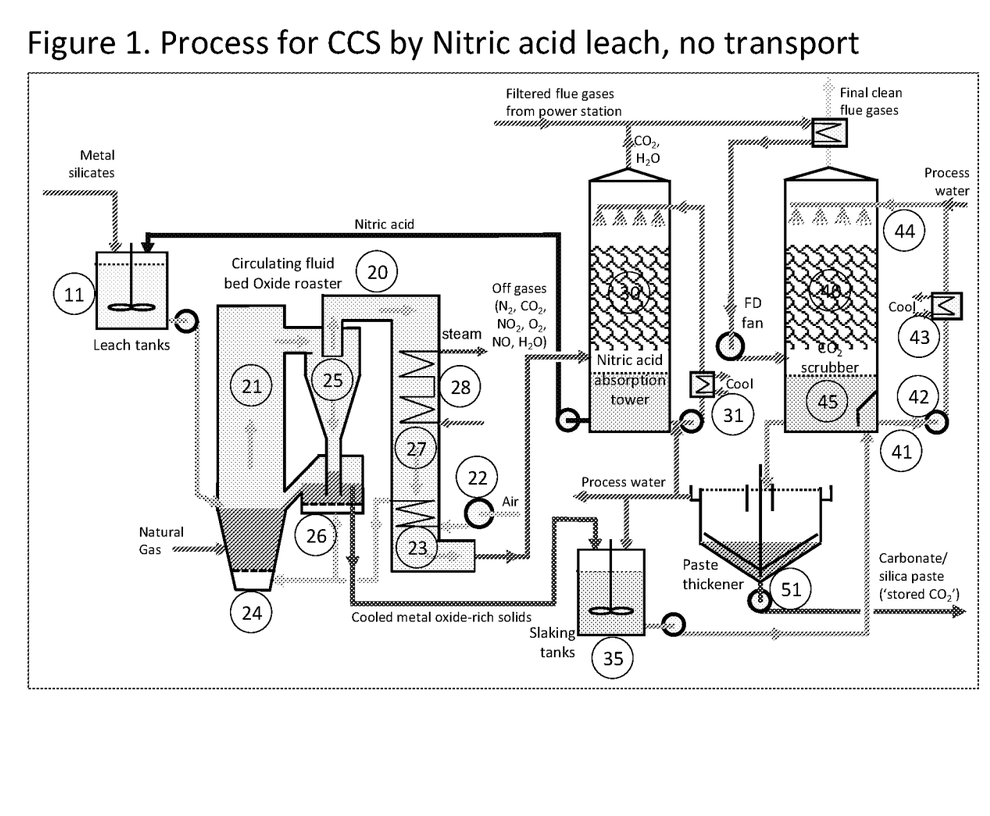
FIG. 1 is a schematic of a first embodiment of a carbon dioxide sequestration process and system set forth in the Summary.
Figure 2:
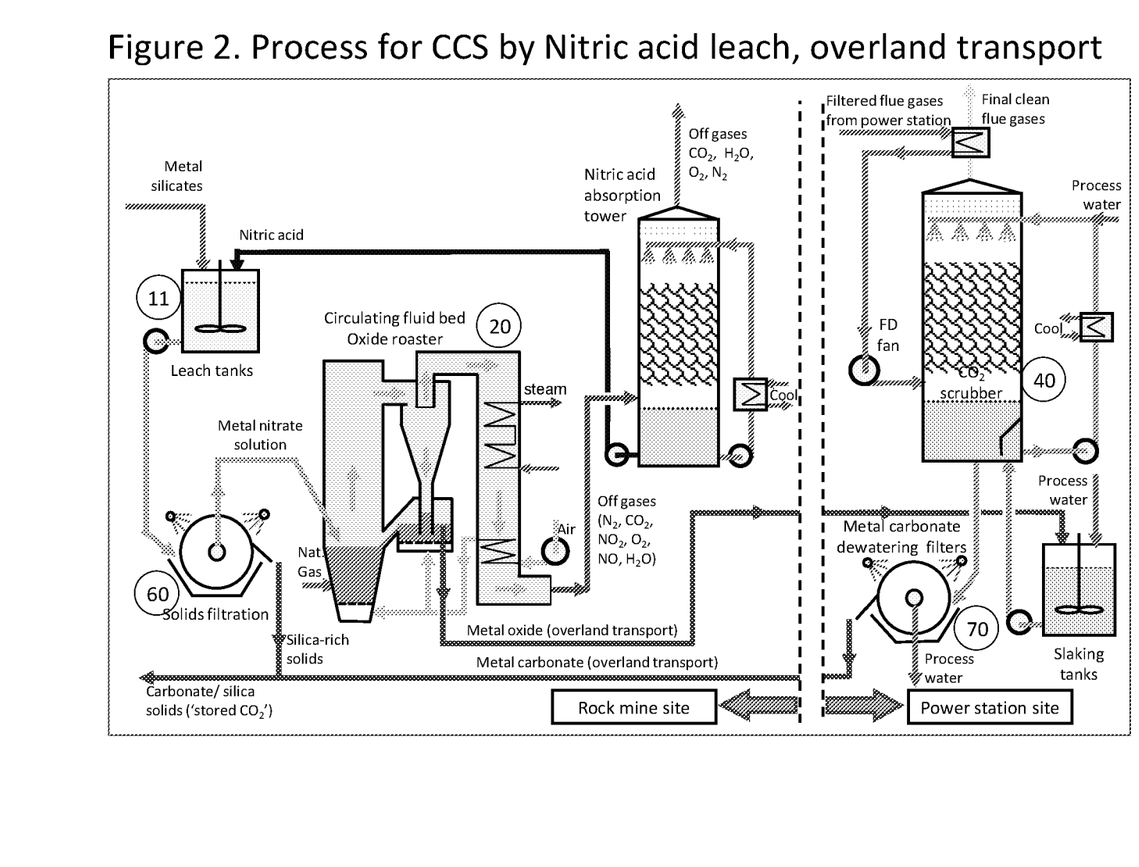
FIG. 2 is a schematic of a second embodiment of a carbon dioxide sequestration process and system that is a variation to the process and system depicted in FIG. 1.

Thereafter, particular reference with be made to FIG. 2 in detail, which Figure describes only those parts of the overall embodiment of the process that are at variance with FIG. 1 (i.e. FIG. 2 also shows a carbon dioxide sequestration process and system that is similar to but is modified to that shown in FIG. 1). The modifications made in FIG. 2 are to minimise the total contribution to the cost of capturing and permanently storing a tonne of carbon dioxide, when the costs of such transport are significant.

General Description of the Process and System

In general, the process comprises reacting in a first reactor 11 a blend, which may be a paste or slurry, of a metal silicate with nitric acid. The metal silicate may be the silicate of an alkaline-earth metal, in particular magnesium or calcium, or the alkali metal lithium. For practical purposes a concentrated blend of nitric acid and water is selected, for example 68% nitric acid, or even more concentrated, up to 90% acid by weight.

The first reactor 11 is designed to facilitate one or other of the variants of the following reactions shown between nitric acid and any of a number of metal silicates. In the following examples, when the metal silicate rock includes the magnesium silicate mineral serpentine $Mg_3Si_2O_5(OH)_4$, reaction (1a) applies; if it includes the magnesium silicate mineral olivine $Mg_2SiO_4$ reaction (1b) applies; if the rock or other material contains calcium silicate mineral wollastonite $CaSiO_3$ (compounds with the same formula are also common ingredients in many industrial slags and Portland cement products and precursors) reaction (1c) applies; and, if the rock contains the lithium-aluminium silicate mineral spodumene, reaction (1d) applies:

$$Mg_3Si_2O_5(OH)_4 + 6HNO_3 \rightarrow 3Mg(NO_3)_2 + 2SiO_2 + 5H_2O \quad (1a)$$

$$Mg_2SiO_4 + 4HNO_3 \rightarrow 2Mg(NO_3)_2 + SiO_2 + 2H_2O \quad (1b)$$

$$CaSiO_3 + 2HNO_3 \rightarrow Ca(NO_3)_2 + SiO_2 + H_2O \quad (1c)$$

$$LiAlSi_2O_6 + HNO_3 \rightarrow LiNO_3 + AlSi_2O_5(OH) \quad (1d)$$

Reactions (1a) and (1b) are appropriate for embodiments of the process where the primary purpose is the capture and storage of carbon dioxide from large energy-related point sources, such as power stations fired by carbon-containing fossil fuels such as coal or natural gas, other petroleum-derived fuels or biomass. Reaction (1c) is likely to be appropriate where the primary purpose is the capture and storage of carbon dioxide from such industrial point sources as steel mills, where calcium-containing minerals such as limestone are used in the process (e.g. for the purification of molten steel), and where calcium silicate-rich slags are significant by-products. Reaction (1d) is likely to be appropriate under more limited circumstances due to the high value and relative scarcity of lithium-containing silicate minerals. Variants of reaction (1d) suggest processes for the refining of lithium silicate mineral-rich ores for the production of pure lithium carbonate, a form of lithium preferred for the manufacture of lithium batteries. This special case is the subject of a separate, concurrent application filed by the applicant.

The metal silicate and the nitric acid can be reacted in the first reactor 11 at an elevated pressure and at an associated elevated temperature, that is to say, one close to the boiling point of the liquid phase at the prevailing pressure. Alternatively, the nitric acid and the metal silicate can be reacted at ambient pressures. While this may imply a slower reaction, given the lower temperatures that may be applied without boiling the liquid phase, the capital and operating cost of un-pressurized equipment is significantly below that of pressurised equipment, such as continuous autoclaves. The quantity of nitric acid employed is typically not greater than that required (in stoichiometric terms) to extract all of the metal in the metal silicate as nitrate. However, the quantity of nitric acid may be equal to 90% of the stoichiometric quantity.

It is to be understood that the metal silicates fed to the first reactor 11 are almost certain to contain some other components, for example, iron and aluminium compounds that are present in the metal silicates as impurities. In the presence of nitric acid some of these will be converted to nitrates and thereby rendered soluble, while others will resist nitric acid attack and so remain insoluble, thereby adding to the silica and other nitric acid-resistant silica-containing compounds (as apparent on the right-hand side of reactions 1), and increasing the quantity of insoluble solids in the slurry.

The products of the reactions shown on the right-hand sides of reactions (1a), (1b) and (1c), namely, a slurry of an aqueous solution of the metal nitrate in which is dispersed insoluble silica-rich matter, can be passed to a second reactor 20. In the second reactor 20 the total slurry is progressively heated, eventually to a temperature sufficient to first dry and, with further heating, to then decompose the metal nitrate. The temperature to which the feed to the second reactor ultimately has to be heated varies between the three metals being considered: magnesium, calcium and lithium (henceforth magnesium and calcium will be considered, bearing in mind that the intent of this disclosure is an improved carbon capture and storage process).

After water has been boiled off (which may occur at atmospheric pressure at temperatures in the region 100-120° C.) the following decomposition reactions occur, for magnesium and calcium nitrates respectively:

$$2Mg(NO_3)_2 \rightarrow 2MgO + 4NO_2 + O_2 \text{ (T above 330° C.)} \tag{2a}$$

$$2Ca(NO_3)_2 \rightarrow 2CaO + 4NO_2 + O_2 \text{ (T above 500° C.)} \tag{2b}$$

It follows that the products of the second reactor naturally divide into two phases:

a gaseous phase, comprised of nitrogen dioxide (and perhaps other oxides of nitrogen including nitric oxide) along with some oxygen, and water vapour from: free water present as an accompaniment to the added nitric acid; surface moisture (if any) accompanying the metal silicate; and water formed according to reactions 1a, 1b and 1c;

a solids phase, comprised of the metal oxides formed according to reactions 1a, 1b and 1c, and silica and other non-volatile inerts, also according to these reactions.

The heat energy required to raise the temperatures in the second reactor in excess of the temperatures shown in reactions 2a and 2b, firstly to evaporate all free and formed water, and secondly, to decompose the nitrate ions as shown in those reactions, is provided by the combustion of coal, natural gas or other fossil fuel in air. In such cases, the gases from the combustion of the fossil fuel in air: carbon dioxide, water vapour and air depleted in oxygen (i.e. nitrogen and oxygen plus the other inert gases including normally found in air), add to those produced from reactions 1a to 1c.

The second reactor 20 can be a circulating fluidized bed reactor operating at a temperature in excess of the temperatures shown in reactions 2a and 2b. In this case, the circulating solids stream is comprised of the solids from the right-hand sides of the sets of reactions above. In the case of:

a magnesium silicate such as serpentinite or olivine, reactions 1a, 1b and 2a;

a calcium silicate such as the mineral wollastonite or a calcium silicate slag or Portland cement precursor or product, reactions 1c and 2b.

The hot solids, as they are drawn off, are cooled by allowing them to exchange their sensible heat with cool ambient air fed to the fluid bed system 21 and 26, thereby pre-heating this air, which allows, and is used for, the combustion of the (fossil) fuel. Also, the hot off-gases are substantially cleaned of their burden of dust, then passed through a convective-type heater 27 configured as a waste-heat boiler in order to generate electricity and high-pressure steam 28 (in a co-generation arrangement) for use elsewhere in the total plant.

The cooled solids from the second reactor 20, most of which will have taken the form of pellets or prills, pass to a third reactor in the form of slaking tanks 35, where the solids are carefully added to a controlled amount of water to form a pumpable slurry. In all cases, the metal oxides are converted to metal hydroxides as follows (in the case of the oxides of magnesium and calcium respectively):

$$MgO + H_2O \rightarrow Mg(OH)_2 \tag{3a}$$

$$CaO + H_2O \rightarrow Ca(OH)_2 \tag{3b}$$

The pumpable slurry is pumped directly to a fourth reactor, which takes the form of a flue gas scrubber 40, through which passes flue gases containing carbon dioxide that are to be removed by reacting them with the pumpable slurry from the third reactor 35.

This flue gas scrubber 40 can comprise a vessel (e.g. tower or column) through which flue gases or other gas streams containing carbon dioxide and perhaps relatively small quantities of other acid-forming gases, including oxides of sulphur SOx and oxides of nitrogen NOx. The flue gas scrubbing vessel can be largely empty, but fitted with a series of spray headers through which the scrubbing medium (in this case, the pumpable slurry from the third reactor) is pumped by one or more recirculation pumps. The volumetric flow rate of scrubbing medium can be substantially in excess of the design rate at which new slurry (the pumpable slurry from the third reactor) is fed to the scrubber.

In this scrubber/fourth reactor, one or more of the following reactions can occur, when the slurry contains magnesium hydroxide:

$$Mg(OH)_2 + CO_2 \rightarrow MgCO_3 + H_2O \quad (4a)$$

$$Mg(OH)_2 + 2CO_2 \rightarrow Mg(HCO_3)_2 \quad (4b)$$

$$Mg(HCO_3)_2 \rightarrow MgCO_3 + CO_2 + H_2O \quad (4c)$$

Reaction 4b (the formation of soluble magnesium bicarbonate) tends to occur at temperatures below 50° C., while reaction 4c (the decomposition of the bicarbonate to the normal, essentially insoluble, carbonate) tends to occur in more concentrated environments, and when temperatures are raised to above 50° C. These reactions may be relatively slow so, in most embodiments, the scrubber would contain, or operate in series with, a substantial storage of agitated slurry. This storage can take the form of a pool maintained in the lower levels of the scrubbing vessel.

For the magnesium hydroxide-rich slurry, small quantities of ammonia may be added to the slurry as it enters the scrubber circuit. Ammonia tends to increase reaction rates of magnesium hydroxide, by increasing its solubility in water. Ammonium ions form as the ammonia reacts with acid anions, both carbonate and bicarbonate, but in particular sulphate and nitrate ions from the oxidation of SOx and NOx formed during the combustion of the fuels that created the flue gases.

It is because magnesium hydroxide is normally almost insoluble in water (as is magnesium carbonate), which tends to cause reaction 4a to be slow. Ammonium ions combine with the few hydroxide ions formed from the small quantities of magnesium hydroxide that do dissolve, to form essentially un-ionised ammonia and water, thereby removing hydroxyl ions, thereby in turn, prompting more magnesium hydroxide to dissolve. Only small quantities of ammonia (perhaps 0.1% of the water forming the aqueous phase) are required to increase significantly the rate of reaction 4a, nor is any of the ammonia consumed in the reaction; this is to say, ammonia has a catalytic effect. When the slurry is a calcium hydroxide-rich slurry, the reactions are essentially the same as for magnesium:

$$Ca(OH)_2 + CO_2 \rightarrow CaCO_3 + H_2O \quad (4d)$$

$$Ca(OH)_2 + 2CO_2 \rightarrow Ca(HCO_3)_2 \quad (4e)$$

$$Ca(HCO_3)_2 \rightarrow CaCO_3 + CO_2 + H_2O \quad (4f)$$

Calcium hydroxide, while generally considered to be sparingly soluble in water, is significantly more soluble than is magnesium hydroxide, while calcium carbonate is even less soluble than is magnesium carbonate. The reactions therefore will proceed more rapidly, and there is no requirement for ammonia.

After several passages through the scrubbing vessel, most of the metal ions are converted to the corresponding (essentially) insoluble carbonate. The result is a dense slurry of metal carbonate, silica and other insoluble solids in relatively clean (the presence of soluble solids only in low concentrations) and mildly alkaline water.

Much of this free water is recovered by transferring the slurry to a solids-liquids separation stage 51 in order to recover as much of the water as is practicable in a suspended-solids-free state, while maximising the solids concentration of the insoluble-solids product. The solids-liquids separation stage 51 can be a paste thickener that is configured to maximise the solids density, hence minimise the water content, of the underflow. In other forms the solids-liquids separation stage can include filtration stages such as vacuum or pressure filters.

The relatively clear liquid phase is returned to process as process water, in particular, to slurry more metal-rich oxide solids from the second reactor (the oxide roaster). The solids phase, in the embodiment where a paste thickener is employed, may be a dense paste that is pumpable using special positive-displacement pumps, such as are used for pumping concrete. This paste may be pumped away to a secure repository where it can be stored essentially in perpetuity. This becomes the final repository for the stored carbon dioxide, a repository that need not be monitored for leaks or lead to tremors.

The off-gases from the second reactor can be cooled. During such cooling they are used, firstly, to raise steam 28 by transferring some of their sensible heat to boiler feedwater in a convective-type waste-heat boiler. Secondly, they may be further cooled as they transfer via a heat exchanger 23 more of their sensible heat to the ambient air to be used for the combustion of the fuel, which may be natural gas or coal or other suitable combustible fuel.

The off-gases, a mix of nitrogen and oxygen (from air), carbon dioxide, nitrogen dioxide, nitric oxide and water vapour, can be passed to a fifth reactor 30, an absorption tower (or series of towers), where the gases are contacted by a recirculating stream of nitric acid. This stream absorbs the nitrogen dioxide, nitric oxide and some of the oxygen created by way of reactions 2a and 2b, becoming increasingly concentrated in nitric acid. Process water is added to the recirculating stream of nitric acid in appropriate quantities to maintain the nitric acid concentration at desired levels, e.g. 68 wt. % nitric acid, with the balance being water. These reactions are strongly exothermic (liberate substantial heat) and this heat of reaction needs to be continuously removed. This can be accomplished by way of a heat exchanger 31 through which cooling water passes.

The principal reactions occurring in the absorption tower are:

$$4NO_2 + 2H_2O + O_2 \rightarrow 4HNO_3 \quad (5a)$$

$$2HNO_3 + 3NO_2 + H_2O \rightarrow 4HNO_3 + NO \quad (5b)$$

$$2NO + O_2 \rightarrow 2NO_2 \quad (5c)$$

This acid is recycled to the first reactor 11 (the leach tanks) to leach more of the metal in question (magnesium, calcium or lithium) from additional silicate rock.

The nitric acid absorption tower will not tend to capture significant quantities of the atmospheric gases nitrogen and oxygen, nor will carbon dioxide be captured in such an acidic environment. Because of the cooling of the circulating nitric acid solution, some water vapour will condense, tending to reduce the concentration of the recirculating nitric acid, and the absolute humidity of these residual gases. The gas stream containing these gases is thus joined with the major carbon dioxide-containing gas stream, which passes to the main scrubbing vessel, so that this carbon dioxide may also be captured and eventually permanently stored, even though it is small in quantity in comparison to that emanating from the power station or other source.

The above description cover a simples variant of the process and system, such as where the source of the carbon dioxide-containing flue gases and the source of the metal silicate rock to be used to store the carbon dioxide (as metal carbonates) captured from these flue gases, are relatively close to each other. This variant does not specifically address situations where the source of carbon dioxide is remote from the source of the metal silicate rock. There may indeed be instances where the two are relatively close together (within a few tens of kilometres), meaning it becomes possible to transport the metal silicate rock to the power station on one or more belt conveyors, and to use similar belt conveyors to return the carbonated product (the 'stored carbon dioxide') from the power station back to the mine for permanent emplacement, including in mine voids, or to a third location as appropriate.

But there are likely to be many more instances where the power station or other point-source of carbon dioxide and the silicate rock deposit are so far apart that the costs involved in transporting silicate rock from its mine/quarry to the power station, and transporting carbonated product back to the mine/quarry (or to some suitable third location) become sufficiently high that a change in the overall flowsheet is warranted to minimise these transport costs. Contributing to the high transport costs is that the total tonnage of carbonated product will exceed the tonnage of metal silicate rock used for the capture, by the mass of carbon dioxide that is captured, as per reactions 1a to 1c (although the net addition may be reduced insofar as some water of hydration is removed from the rock, as shown for example in reaction 1b). Such a variant is depicted in FIG. 2.

Should the mine/quarry and power station be, for example, 50 kilometres apart or more (and perhaps 250 kilometres or more), it can prove to be more economically attractive to transport not metal silicate rock, but metal oxide as a dry solid from the mine to the power station, and metal carbonate as a dewatered solid (e.g. a filter cake) in the reverse direction. In variant shown in FIG. 2, when the metal is magnesium (reactions 1a and 1b), it makes sense to transport magnesium oxide (magnesia) from the mine to the power station instead of serpentinite (the most likely candidate metal silicate for carbon capture and storage), because typically, the mass of magnesium oxide required is roughly one-third the mass of serpentinite rock that would need to be transported to store the same quantity of carbon dioxide and have the same overall effect. At the power station (or other point source) site the magnesium oxide is converted to magnesium carbonate (to the mineral magnesite). After dewatering, the quantity of magnesium carbonate per tonne of carbon dioxide to be stored requiring transport would be but half that required were it carbonated serpentinite to be transported.

In a further variation, the metal oxide may be hydrated according to reactions 3a or 3b. In this variation, sufficient additional water can be added to convert the metal hydroxide to relatively dense but pumpable slurry, which may be referred to as milk of magnesia (reaction 3a) and milk of lime (reaction 3b) respectively. In this embodiment, a pipeline may be used to transport the metal oxide/hydroxide instead of using for example, a railway connection, or trucks over public roads. In this variation also, the metal carbonate product (magnesite in the case of reactions 4a-4c, and the limestone minerals calcite and aragonite in the case of reactions 4d-4f) may also be transported in the reverse direction (from power station to silicate rock mine/quarry) by pipeline instead of by rail or road transport.

These variations require the introduction of further processing steps, beginning with facilities 60 for the separation of the solids from the metal nitrate-rich aqueous phase produced in the first reactor, the Leach tanks 11. These facilities can take the form of one or more of a series of counter-current decantation thickeners, horizontal belt vacuum filters, vacuum drum filters or plate and frame filter presses. Typical tonnages are large: a single 1,000 MWe coal-fired power station, from which a carbon capture and storage plant may be expected to capture and store 5 million tonnes of carbon dioxide per annum, may require the separation of aqueous phases from of the order of 10 million tonnes of leached serpentinite residue annually, or at a rate of up to 2,000 tonnes per hour of solids, which may in turn require (in an embodiment) 10 large horizontal vacuum belt filters each 5 metres wide and 30 metres long.

But in the second reactor 20 (the circulating fluid bed oxide roaster), wherein the magnesium (or calcium) nitrate solution is dried and decomposed to magnesium (or calcium) oxide, a substantially smaller quantity of material can be handled, since the inert solids contained as an insoluble residue in the product stream of the first reactor are no longer present.

Furthermore, this variation invites consideration of these residues (after they have been separated and washed to remove valuable solutes by the filters or similar), that are rich in silica, a material that may be marketed profitably to third parties. Also, this embodiment invites consideration of the production of pure calcium (or magnesium) nitrate solutions (and possibly crystals, with the addition of a concentration and crystallisation step), and of pure magnesium oxide (caustic magnesia) or calcium oxide (quicklime) as marketable by-products.

It also invites consideration of the solid residues as economical sources of valuable base and precious metals that were originally present in the metal silicate rock e.g. serpentinite. The non-silica fraction of the insoluble residues is likely to be iron-rich, therefore amenable to separation from the silica fraction by physical processes that employ the density differences between iron-rich residues and silica, and/or their differences in magnetic susceptibility, using plant and equipment (not shown on FIG. 2) that is generally familiar to persons skilled in mineral processing. The significance of the iron-rich fraction is that this may host so-called siderophile (iron-loving) elements including nickel, cobalt and platinum-group metals.

Also of significance is that, as a result of the chemical processes (leaching and separation) employed in reactor 11, and in the solids-liquids separation facilities 60, followed by physical separation processes as just described, these metals may have been concentrated more than ten-fold over their concentration in the original metal silicate rock e.g. serpentinite.

The choice between any of the these variations, as depicted in FIGS. 1 and 2, will ultimately be decided on a case by case basis—decisions to separate the solids and liquids phases from the leach reactors may well be justified by markets for pure metal oxides or carbonates, or for base and precious metals as described.

Specific Description of the Process and System of FIG. 1

With particular reference to FIG. 1 in detail, there is shown a flow diagram of a System 10 for performing a carbon dioxide ($CO_2$) capture process from a gas feed stream containing carbon dioxide outputted from a power station, in accordance with a first embodiment. The System 10 comprises various apparatus as described herein, arranged to perform a Process 100 of reacting a metal silicate rock with concentrated nitric acid solution to form a metal nitrate salt/silica/water slurry. In the system and process a gas stream containing carbon dioxide is scrubbed with slurry comprised of inter alia the hydroxides of the metals leached from the metal silicate and taken into solution by the nitric acid, to form precipitates of metal carbonates which add to the other insoluble components in particular silica, present in the metal silicate rock. The result is a solid residue that represents stored carbon dioxide that may be safely stored essentially in perpetuity.

In the embodiment of the system and process depicted in FIG. 1, ground metal silicate rock, in this embodiment a rock rich in the mineral serpentinite (a hydrated magnesium silicate), is blended with concentrated nitric acid in leach tanks 11, which may be a series of three covered tanks fitted with agitators to maintain solids in suspension, affording a total detention time (average time for the slurry to pass through them all) of perhaps three hours at design processing rates. In these tanks the nitric acid leaches the magnesium from the rock converting it to soluble magnesium nitrate according to reaction 1a:

$$Mg_3Si_2O_5(OH)_4 + 6HNO_3 \rightarrow 3Mg(NO_3)_2 + 2SiO_2 + 5H_2O \quad (1a)$$

The entire slurry is then transferred by for example pumps and pipelines to a second reactor system, which takes the form of a circulating fluidized bed system 20 operating at essentially atmospheric pressures. It is to be appreciated that other forms of reactor may be suitable for this duty including bubbling fluidized bed systems, also operating essentially at atmospheric pressure, or circulating or bubbling fluidized beds operating at elevated pressures; rotary kilns, multiple-hearth furnaces and hollow-flight conveyors, wherein molten salt (which may be a metal nitrate) is circulated through the hollow flights of one or more screws arranged to convey as well as heat the feed slurry to the desired temperature. This embodiment describes how a circulating fluidized bed reactor achieves the essential reaction, which is expressed by reaction 2a:

$$2Mg(NO_3)_2 \rightarrow 2MgO + 4NO_2 + O_2 \text{ (T above 330° C.)} \quad (2a)$$

As its name suggests, a circulating fluidized bed reactor involves an inventory of solids that are maintained in vigorous circulation and suspension by a current of gases. The gas velocities are maintained at a sufficiently high level that there is no clear demarcation between a solids-dense phase and a largely solids-free phase in the left-hand chamber 21 of the roaster, however, the solids density per cubic metre of space may be higher in the lower levels of the chamber 21 than it is in the higher levels, as the coarsest, heaviest solids tend to gravitate to its lower portions with greater force than do lighter solids. The gas current is maintained by a forced-draft fan 22 that draws in ambient air, which is preheated in a convective air pre-heater 23 (by partially cooled off-gases) before passing to a plenum 24, for distribution to form an upward-passing current of hot air that is fast enough to maintain most solids in suspension. Natural gas or other fuel is injected into this rising current of air, causing combustion, which greatly increases the gas temperature, but the solids density is sufficiently high (perhaps 40 kilograms per cubic metre) and conditions sufficiently turbulent that the solids are rapidly heated to a controlled temperature, which may be in excess of 400° C. in this embodiment. Also at this point, the slurry from reactor 1 (the leach tanks) is sprayed or otherwise distributed directly into the rising cloud of hot solid particles and combustion gases. Initially, slurry coats the particles in a thin film, which is quickly heated both by the hot particles and by the hot gases, flashing off the water as vapour and converting the magnesium nitrate to magnesium oxide according to reaction 2a, and leaving the particles with a new layer of magnesium oxide.

$$2Mg(NO_3)_2 \rightarrow 2MgO + 4NO_2 + O_2 \text{ (T above 330° C.)} \quad (2a)$$

There is therefore a tendency for the particles to grow by accretion, and as they do so they will tend to collect in the lower regions of the chamber 21. Most particles including fines rubbed off the larger particles by attrition, and larger particles that are broken into smaller fragments whether by turbulence, impacts with other particles or thermal shock, will be swept upwards and enter a large hot cyclone 25, wherein particles larger than 20 microns are classified out of the hot gas stream, which leaves via the vortex finder (top) of the cyclone to enter the convective waste-heat boiler pass 28. There, high-pressure steam is generated as the gas transfers much of its sensible heat to boiler feedwater.

Particles separated by the hot cyclone 25 fall to a separate cooling bubbling fluidized bed arrangement 26. They are maintained in suspension by a portion of the total combustion air being supplied to the calciner 20, and in the course of this activity the hot particles are cooled as they transfer their sensible heat to the suspension air. But this only applies to the relatively small fraction of solids that are continuously withdrawn from the calciner 20, at a rate that in magnesium terms, equals the rate at which magnesium (as nitrate) enters the calciner 20 from the leach tanks 11. For example, if the product from the leach tanks 11 is fed to the calciner 20 at a rate sufficient to transfer 100 tonnes per hour of magnesium nitrate (which will contain 16 tonnes of elemental magnesium, then solids will be withdrawn at a rate equal in elemental magnesium terms, even as the magnesium is present as the oxide (caustic magnesia), meaning that magnesium oxide is withdrawn at a rate of 27 tonnes per hour (along with large quantities of silica and other inerts).

But the vast majority of the solids: perhaps 98 percent, essentially by-pass the bubbling bed cooler 26, flowing directly into the chamber 21, whereupon they re-enter the current of up-flowing hot gases and their substantial burden of hot solids, to pass through the hot cyclone 25, forming a continuously circulating flow of hot gases and suspended solids that serves as a massive heat sink and highly efficient heat transfer system for processing incoming feed slurry.

The off-gases, rich in the gases on the right-hand side of reaction 2a, having passed through the back pass 23 of the calciner 20 and in the process, transferring most of their sensible heat both to boiler feedwater and to pre-heat combustion air, pass to the nitric acid absorption tower 30. In this embodiment this consists of one or more towers familiar to those who have been involved in nitric acid production plants; it may be a tower or series of towers filled with a loose packing, or a series of sieve trays or bubble caps, through which liquids (in this instance nitric acid with water) flow downwards and gases and vapours flow upwards. It may operate at atmospheric pressure or (more likely, particularly with larger plants) may operate at elevated pressures, perhaps 9 Bar. These gases, together with some water vapour, are absorbed into a continuously cooled (by the heat exchanger 31, cooled in turn by circulating cooling water) downflow of nitric acid and water mix. As they are absorbed, more nitric acid is formed according to reactions 5a-5c.

$$4NO_2 + 2H_2O + O_2 \rightarrow 4HNO_3 \quad (5a)$$

$$2HNO_3 + 3NO_2 + H_2O \rightarrow 4HNO_3 + NO \quad (5b)$$

$$2NO + O_2 \rightarrow 2NO_2 \quad (5c)$$

The quantity of water vapour reporting to the absorption tower 30 may be in excess of that needed to produce a suitably concentrated nitric acid, in which case the dilute acid may be concentrated by fractional distillation using processes and equipment familiar to those involved with nitric acid production (equipment for doing this is not shown in FIG. 1; it should be appreciated that the simple column arrangement shown in FIG. 1 is meant only to indicate facilities for converting gases such as those shown in reactions 5a-5c, to nitric acid, and subsequently concentrating it to, for example, 68% nitric acid, the balance water). Recovered water, essentially free of nitric acid, may be used as process water elsewhere in the system.

The cooled solids leaving the calciner 30 are a blend of magnesium oxide and insoluble silica and other inerts. These are conveyed to the slaking tanks 35, where the magnesium oxide is converted to the hydroxide $$MgO + H_2O \rightarrow Mg(OH)_2 \qquad (3a)$$

Sufficient process water is added to convert the solids to slurry; it is not essential that all of the magnesium oxide be converted to the hydroxide, as the reaction will be completed in the next reactor, the flue gas scrubber 40. Small quantities of ammonia may be added at this point to catalyse the reaction occurring therein:

$$Mg(OH)_2 + CO_2 \rightarrow MgCO_3 + H_2O \qquad (4a)$$

$$Mg(OH)_2 + 2CO_2 \rightarrow Mg(HCO_3)_2 \qquad (4b)$$

$$Mg(HCO_3)_2 \rightarrow MgCO_3 + CO_2 + H_2O \qquad (4c)$$

In the scrubber 40 the slurry from the slaking tanks 35, which in this embodiment may be a series of covered, agitated tanks, is fed in such a way that fresh slurry does not immediately mix with slurry circulating through the scrubber. It enters the scrubber pool 45, close to the intake of the circulating pump 42, which is partially isolated from the bulk of the contents by a baffle 41, leaving a gap beneath it under which slurry may pass to the pump inlet. Since the pumping rate of this pump (or more likely several pumps) substantially exceeds the flow rate of new slurry into the scrubber 40, slurry is continuously drawn under the baffle, preventing fresh slurry from mixing with the contents of the scrubber pool.

Reacted slurry is drawn from the circulating flow (which passes from the pump through the cooling heat exchanger 43, installed to control the temperature, in particular removing heat generated from the exothermic reactions (4a) and (4b), the spray headers and sprays 44 and down to the pool 45), and transferred to a dewatering device, which in this embodiment is a paste thickener 50. There, the solids settle out and compact under their own weight to form a dense paste that may be pumped away by pumps 51, which may be of the positive displacement kind, suitable for such viscous pastes. The thickened underflow represents the 'stored carbon dioxide'. Suitably emplaced, residual water will beevaporated away, leaving an inert mass that requires no monitoring foremissions of carbon dioxide and will not lead to tremors.

Specific Description of the Process and System of FIG. 2

FIG. 2 shows an embodiment where the coal-fired power station (the source of carbon dioxide) is far from the source of the metal silicate rocks that will be made to react with this carbon dioxide and be converted to metal carbonate; in this embodiment the metal is magnesium and the metal silicate is serpentinite.

The embodiment is as for FIG. 1 apart from the following changes:

The slurry from the leach tanks 11 first passes to a solids-liquids separation device, shown in stylized form in this embodiment as a drum vacuum filter, but it could well be a horizontal belt filter. Here, the insoluble solids are filtered out and washed of their contained magnesium nitrate and any other soluble. The filter cake, a mass of silica-rich solids is conveyed to permanent emplacement (although the option exists for further processing this material to recover any potentially valuable components), while the filtrate, essentially free of insoluble solids, passes to the circulating fluid bed roaster 20. While the detailed configuration of an optimised roaster would differ from that implied in FIG. 1 to account for the differences in the feed, the overall reactions are the same (reaction 2a).

The magnesium oxide produced via reaction 2a is transported, either as a solid in dry form e.g. by rail or truck, to the location of the power station, or it is converted to a dense but pumpable magnesium hydroxide slurry by the addition of the appropriate amount of water (reaction 3a). This material is relatively pure, and the option exists for seeking markets for it, either as it is, or after further processing to add further value to it.

The operation of the scrubber 40 is essentially the same as in the embodiment shown in FIG. 1, but the final product, relatively pure magnesium carbonate, is shown as being dewatered by a vacuum drum filter station 70—although this could be a horizontal belt filter. It could also be a paste filter as shown in FIG. 1.

This magnesium carbonate is then transported overland back to the serpentinite mine, perhaps by back-loading in the trains or trucks used to transport magnesium oxide to the power station site. At the mine it may be blended with the silica rich filter cake for permanent emplacement.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features.

The invention claimed is:

1. A process for capturing carbon dioxide from a gas stream, the process comprising:
   in a first stage, reacting a metal silicate with nitric acid to produce a metal nitrate, the metal silicate being one or more of: an alkaline-earth metal silicate or an alkali metal silicate;
   in a second stage, heating the metal nitrate from the first stage to a temperature sufficient to decompose the metal nitrate to a metal oxide;
   in a third stage, mixing the metal oxide with water to convert the metal oxide to a metal hydroxide solution;
   in a fourth stage, scrubbing the gas stream with the solution from the third stage such that the metal hydroxide reacts with the carbon dioxide to form a metal carbonate/bicarbonate product.

2. The process as claimed in claim 1 wherein decomposition of the metal nitrate to the metal oxide in the second stage produces off-gases which are passed to a fifth stage in which they are contacted by a recirculating aqueous stream to produce nitric acid for use in the first stage.

3. The process as claimed in claim 2 wherein the second stage heating of the metal nitrate comprises the combustion of a fuel which, together with the decomposition of the metal nitrate, produces off-gases comprising a mix of nitrogen and oxygen, carbon dioxide, nitrogen dioxide, nitric oxide and water vapour, with the off-gases from nitric acid production that comprise carbon dioxide being passed to the fourth stage scrubbing.

4. The process as claimed in claim 1 wherein the nitric acid passed to the first stage comprises a blend of nitric acid and water.

5. The process as claimed in claim 4, wherein the blend of nitric acid and water comprises concentrated nitric acid from 65 wt. % up to 90 wt. % nitric acid.

6. The process as claimed in claim 1 wherein, in the first stage, the metal silicate and nitric acid are reacted together at pressures elevated relative to atmosphere.

7. The process as claimed in claim 1 wherein, in the first stage, the metal silicate and nitric acid are blended to form a paste, slurry or solution.

8. The process as claimed in claim 7 wherein, prior to being passed to the second stage, insoluble solids are separated from the metal nitrate paste, slurry or solution.

9. The process as claimed in claim 1 wherein, in the second stage, the metal nitrate is progressively heated to a temperature that is sufficient to dry and then, with further heating, to decompose the metal nitrate.

10. The process as claimed in claim 1 wherein, prior to the third stage, dried, decomposed metal oxide solids from the second stage are cooled and, in the third stage, the cooled solids are added into a controlled amount of water to form metal hydroxide slurry.

11. The process as claimed in claim 1 wherein the metal oxide solids from the second stage are cooled by exchanging heat with air for combustion that is fed into the second stage heating.

12. The process as claimed in claim 1 wherein, in the fourth stage, metal hydroxide slurry pumped from the third stage is sprayed down into the upcoming gas stream, with a proportion of the slurry being recirculated through the fourth stage.

13. The process as claimed in claim 1 wherein solids from the fourth stage are passed to a solids-liquids separation stage in which the carbonate/bicarbonate solids are separated from water, with the water being returned to the process.

14. The process as claimed in claim 1, wherein the alkaline-earth metal of the alkaline-earth metal silicate is magnesium or calcium.

15. The process as claimed in claim 1, wherein the alkali metal of the alkali metal silicate is lithium.

* * * * *